(12) United States Patent
Huang et al.

(10) Patent No.: US 12,319,022 B2
(45) Date of Patent: Jun. 3, 2025

(54) METHOD FOR PRODUCING A SCREEN BODY, AND SCREEN

(71) Applicant: ANDRITZ AG, Graz (AT)

(72) Inventors: Youping Huang, Kirchbach in Steiermark (AT); Daniel Stelzer, Veitsch (AT); Franco Pichler, Voitsberg (AT); Stefan Willberger, Eggersdorf bei Graz (AT); Markus Egger, Graz (AT)

(73) Assignee: ANDRITZ AG, Graz (AT)

( * ) Notice: Subject to any disclaimer, the term of this patent is extended or adjusted under 35 U.S.C. 154(b) by 406 days.

(21) Appl. No.: 17/802,257

(22) PCT Filed: Dec. 22, 2020

(86) PCT No.: PCT/AT2020/060484
§ 371 (c)(1),
(2) Date: Aug. 25, 2022

(87) PCT Pub. No.: WO2021/184051
PCT Pub. Date: Sep. 23, 2021

(65) Prior Publication Data
US 2023/0081259 A1    Mar. 16, 2023

(30) Foreign Application Priority Data
Mar. 16, 2020 (AT) .............................. A 50221/2020

(51) Int. Cl.
*B30B 9/26* (2006.01)
*B01D 29/11* (2006.01)
(Continued)

(52) U.S. Cl.
CPC .............. *B30B 9/26* (2013.01); *B01D 29/111* (2013.01); *B01D 29/35* (2013.01);
(Continued)

(58) Field of Classification Search
CPC .. B30B 9/12; B30B 9/121; B30B 9/26; B01D 29/35; B01D 29/94; B01D 29/111; B01D 29/6476; B33Y 80/00
See application file for complete search history.

(56) References Cited

U.S. PATENT DOCUMENTS 3,276,354 A * 10/1966 Burner .................... B29C 48/76
                                                                100/129
4,624,786 A    11/1986 Schlegel
(Continued)

FOREIGN PATENT DOCUMENTS

CN    101633234    1/2010
CN    105817077    8/2016
(Continued)

OTHER PUBLICATIONS

Int'l Search Report (Form PCT/ISA/210) conducted in Int'l Appln. No. PCT/AT2020/060484 (Jul. 15, 2021).
(Continued)

*Primary Examiner* — Jimmy T Nguyen
(74) *Attorney, Agent, or Firm* — GREENBLUM & BERNSTEIN, P.L.C.

(57) ABSTRACT

A method for producing a screen body for a screen used in a screw press, which screen body comprises one or more openings on a screen surface, In order to achieve a particularly long service life, it is provided that the screen body is formed by a sintering process and/or an additive manufacturing process, in particular a 3D printing process. Further embodiments include a screen, in particular for a screw press, having a screen body which has openings on a screen surface.

29 Claims, 7 Drawing Sheets

(51) Int. Cl.
  *B01D 29/35* (2006.01)
  *B01D 29/64* (2006.01)
  *B01D 29/94* (2006.01)
  *B30B 9/12* (2006.01)
  *B33Y 80/00* (2015.01)

(52) U.S. Cl.
  CPC ......... *B01D 29/6476* (2013.01); *B01D 29/94* (2013.01); *B30B 9/121* (2013.01); *B33Y 80/00* (2014.12)

(56) References Cited

U.S. PATENT DOCUMENTS

| | | | |
|---|---|---|---|
| 5,351,612 | A * | 10/1994 | Kemper ................ B30B 9/26 100/129 |
| 5,665,232 | A | 9/1997 | Schlegel |
| 7,753,213 | B2 | 7/2010 | Nogalski |
| 9,003,968 | B2 | 4/2015 | Kozanda et al. |
| 10,040,008 | B2 | 8/2018 | Roiss et al. |
| 2016/0287048 | A1 | 10/2016 | Thiyagarajan et al. |
| 2018/0126298 | A1 | 5/2018 | Cabrera et al. |
| 2021/0205850 | A1 | 7/2021 | Branham et al. |

FOREIGN PATENT DOCUMENTS

| | | |
|---|---|---|
| CN | 106039801 | 10/2016 |
| CN | 206853277 | 1/2018 |
| CN | 108204715 | 6/2018 |
| CN | 207941298 | 10/2018 |
| CN | 110052068 | 7/2019 |
| CN | 210 055 609 | 2/2020 |
| DE | 2527193 | 7/1976 |
| DE | 3043194 | 7/1982 |
| DE | 4392041 | 10/1996 |
| DE | 195 41 984 | 5/1997 |
| DE | 19619612 | 11/1997 |
| DE | 19831334 | 1/2000 |
| DE | 202006000583 | 4/2006 |
| DE | 102011086619 | 5/2013 |
| EA | 15159 | 6/2011 |
| EA | 24103 | 8/2016 |
| EP | 0 685 325 | 12/1995 |
| EP | 3321079 | 5/2018 |
| JP | S56-60592 | 5/1981 |
| JP | H07-31116 | 6/1995 |
| JP | 2019-044232 | 3/2019 |
| RU | 87386 | 10/2009 |
| RU | 2612711 | 3/2017 |
| WO | 84/03660 | 9/1984 |
| WO | 2016/188606 | 12/2016 |
| WO | 2018/190803 | 10/2018 |

OTHER PUBLICATIONS

Int'l Written Opinion (Form PCT/ISA/237) conducted in Int'l Appln. No. PCT/AT2020/060484 (Jul. 15, 2021).
Austria Search Report/Office Action conducted in counterpart Austria Appln. No. A50221/2020 (Aug. 21, 2020).
Russia Search Report/Office Action conducted in counterpart Russia Appln. No. 2022126799/05 (Dec. 13, 2023).
Chile Search Report/Office Action conducted in counterpart Chile Appln. No. 202202162 (Oct. 25, 2023).
Japan Office Action conducted in counterpart Japan Appln. No. 2022-521596 (Jul. 19, 2024).
China Office Action conducted in counterpart China Appln. No. 202080098561.3 (Apr. 30, 2024).
$2^{nd}$ China Office Action/Search Report conducted in counterpart China Appln. No. 202080098561.3 (Oct. 22, 2024).
Chen, "Environmental Analytical Chemistry," Jiangxi Sci. & Tech. Publ. House, p. 92 (Sep. 30, 1988).
Huang et al., "Fully and Semi Autogenous Grinding," Metallurgical Industry Press, p. 264 (Jan. 31, 2018).

* cited by examiner

METHOD FOR PRODUCING A SCREEN BODY, AND SCREEN

CROSS-REFERENCE TO RELATED APPLICATIONS

The present application is a U.S. National Stage of International Patent Application No. PCT/AT2020/060484 filed Dec. 22, 2020, and claims priority under 35 U.S.C. § 119 of Austria Patent Application No. A 50221/2020 filed Mar. 16, 2020. Moreover, the disclosure of International Patent Application No. PCT/AT2020/060484 is expressly incorporated by reference herein in its entirety.

BACKGROUND OF THE INVENTION

1. Field of the Invention

The invention relates to a method for producing a screen body which comprises one or more openings on a screen surface, in particular a screen body for a screen used in a screw press.

The invention further relates to a screen having a screen body which comprises one or more openings on a screen surface, in particular a screen for a screw press.

2. Discussion of Background Information

Screw presses are well-known from the prior art. Screw presses of this type are used to separate a liquid out of a transport material, for example, and comprise a screw conveyor arranged helically on a driven worm shaft as well as a housing shell surrounding said conveyor, wherein a transport corridor for the transport material being conveyed is embodied between the worm shaft and the housing shell and is partially bounded by the screw conveyor in order to convey transport material through the transport corridor along a longitudinal axis of the screw press by means of the screw conveyor during a rotation of the worm shaft. The housing shell thereby normally comprises openings so that, via a pressure exerted during a transport of the transport material on the same, liquid is separated out of the transport material and conveyed out of the transport corridor through the openings in order to dry the transport material during a movement through the screw press along a longitudinal axis. The openings are thereby typically introduced into a metal sheet acting as a screen, which metal sheet is part of the housing shell. This screen is formed according to the prior art in that bores are introduced into the metal sheet. Because the metal sheet has a cylindrical contour, this entails great effort.

A proper functioning of the screw press is thereby dependent on a friction between the transport material and the worm shaft, or the screw conveyor arranged on the worm shaft, on the one hand and on the other hand between the transport material and an inner surface of the housing shell, that is, typically the screen embodied as a metal sheet, relative to which the worm shaft is rotationally driven during operation. If the friction between the transport material and the inner side of the housing shell falls below a defined threshold, the transport material is not conveyed along a longitudinal direction of the worm shaft during a rotation of the worm shaft, but is rather merely moved rotationally together with the worm shaft and the screw conveyor about the longitudinal axis and relative to the housing shell, so that no drying of the transport material occurs and a corresponding process comes to a standstill.

According to the prior art, the housing shell comprises, as a rule, a metal screen which has a defined minimum roughness when installed in a new condition, in order to ensure a corresponding friction between the transport material and the housing shell. However, it has been shown that, during operation, a continuous sliding of the transport material, which can be constituted by pulp for example, along the metal screen results in a wear of the screen, which in turn causes a reduction in the roughness of said metal screen. Thus, due to the surface wear of the metal screen, an operation of the screw press over a longer period of time leads to an improper functioning of the screw press caused by insufficient friction.

SUMMARY

This is addressed by the invention. The object of the invention is to specify a method for producing a screen body of the type named at the outset which, when used in a housing shell of a screw press, allows a proper functioning of the screw press for a particularly long period of time and is, at the same time, easy to produce.

Further, a screen of the type named at the outset shall be specified which, when used in a housing shell of a screw press, enables an operation of the screw press over a particularly long period of time.

According to the invention, the first object is attained with a method of the type named at the outset, wherein the screen body is formed by a sintering process and/or an additive manufacturing process, in particular a 3D printing process.

Over the course of the invention, it was found that a material formed by a sintering process and/or an additive manufacturing process such as a 3D printing process in particular exhibits a constant surface roughness, namely even when a portion of the surface is removed, for example due to an abrasive wear. It was found that this effect occurs as a result of the manufacturing process, and is not limited to a specific material. In other words: In contrast to a screen formed in a conventional method, which screen can be embodied as a metal sheet for example, with a screen body produced according to the invention it is no longer possible to polish a surface during operation in such a manner, for example by superficial wear, that a roughness falls below a value necessary for a proper functioning.

In addition, a corresponding manufacturing process is advantageous, especially since widely different geometries can be produced in a simple manner, whereas a geometry of screens from the prior art is often predefined by a tool with which said screens are produced, and cannot be altered without difficulty. As a result, specially adapted screens can easily be formed, for example, for various operating conditions of a screw press, such as a different composition of a transport material that is to be dried, for example, whereby a drying process of this type can be implemented particularly efficiently. Additionally, screens having a different hole geometry for different positions on a screw press can also be easily produced, for example in order to adapt an open surface of the screens to a dry content of the transport material being dried, which dry content varies over a length of the screw press.

Typically, a corresponding material has a predefined porosity so that even a removal of the material on a surface still results in a roughness of a new surface.

Additionally, with a method of this type it is also easy to form a material which contains harder and softer particles, via which a defined roughness can again be obtained even in the case of an abrasion. This can be achieved, for example, via different boundary conditions during a 3D printing process, in particular different temperatures, and/or different starting materials used during the fabrication.

It is beneficial if the screen body is formed by a plastic, a metal, or a ceramic material. Materials of this type have proven to be especially beneficial for use in a sintering process or an additive manufacturing process in order to form a corresponding body. In this case, via a material composition and parameters of the manufacturing process, a defined porosity of the material or a roughness that is obtained even when a surface is removed can also be easily ensured if necessary.

The use of a lightweight material such as a plastic, for example, also has the particular advantage that a replacement of corresponding screens in a screw press is considerably easier than in the case of weighty metal parts. In addition, plastics normally exhibit a lower thermal expansion coefficient than metals, so that thermal expansions or thermal stresses that occur between a stoppage and an operation due to the typically high operating temperature of screw presses of 90° C., for example, are also reduced.

If a plastic is used, it is particularly advantageous if a plastic with a Shore hardness of more than 50, in particular approximately 75, measured according to Shore D, is used in order to obtain a particularly long service life when used in a screw press.

To obtain a high strength and a high rigidity, it can be provided that fibers are worked into the screen body and/or formed in the screen body when the screen body is being formed. Glass fibers or carbon fibers, for example, can thus be worked into the screen body.

To obtain particularly beneficial mechanical properties of the screen body with a simultaneously beneficial roughness of the screen body, it can be provided that the screen body is formed from different materials over a thickness. Different material properties can thus easily be obtained over a thickness, that is, along a direction perpendicular to the screen surface. For example, on a region spaced apart from the screen surface a material with higher strength and/or higher rigidity can thus be used than on the screen surface, for example to achieve merely slight deformations even at the pressures prevailing in a screw press of 1 bar to 10 bar, for example, and temperatures of 90° C., for example, and to ensure the desired roughness on the screen surface at the same time.

In this context, it is particularly beneficial if the screen body is formed from a first material, which constitutes the screen surface, and a second material, which constitutes a region of the screen body spaced apart from the screen surface, wherein the second material has a higher rigidity than the first material.

Additionally, it is preferably provided that the screen body is at least partially formed from a material which is dimensionally stable at a temperature of at least 45° C., in particular at a temperature of at least 90° C., and a pressure load of 1.5 N/mm$^2$.

Preferably, a material with a tensile modulus of at least 800 N/mm$^2$ and/or a tensile strength of at least 20 N/mm$^2$ is used.

To achieve particularly low thermal stresses and thermal expansions, it is beneficial if a material with a longitudinal expansion coefficient of less than 0.0005 is used, in particular less than 0.0002.

Typically, the screen body is formed from a material which is suitable for a use in a wet environment with a pH of 6 to 9, in order to obtain a particularly long service life when used in a screw press.

Additionally, it is particularly beneficial for a use of the screen body in a screw press in which pulp, foodstuffs, and/or sludges are dried if the screen body is formed from a material that is suitable for a dry content of the material conveyed in the screw press of 3% to 40%.

In principle, widely differing metals, plastics, and ceramic materials can be used in order to form a corresponding screen body. It is particularly preferred if a plastic available as of the application date under the trade name aseTK49 from asetec GmbH in Rastenfeld, Austria is used, especially since this plastic exhibits beneficial mechanical properties for a use in a screw press.

It was shown that the material aseTK49 is particularly suitable for a corresponding screen body, especially since this material has a tensile modulus of approximately 1650 N/mm$^2$, an ultimate elongation of approximately 15%, a deformation resistance at 1.5 N/mm$^2$ and 90° C. and at 0.4 N/mm$^2$ and 150° C., and a tensile strength of approximately 40 N/mm$^2$ and a compressive strength of approximately 65 N/mm$^2$ and, at the same time, forms a structure that ensures an essentially constant roughness even in the case of an abrasion. Furthermore, this material is suitable for a use in a screw press under correspondingly wet conditions at the pH levels prevailing thereby.

It has proven effective that the one or more openings are formed during the sintering process and/or the additive manufacturing process. This results in a particularly simple method, even in comparison with a conventional production of a corresponding screen, in which a plurality of holes is typically drilled into a metal sheet in order to form a screen. As part of the additive manufacturing process or the sintering process, it is then also easy to embody a hole geometry in which a cross section of the hole or of the opening increases from an interior to an exterior in order to avoid a clogging of the opening. In addition, even openings that are not perfectly round could, in principle, easily be formed so that there is also no limitation in this regard, though openings with a round cross section are preferred.

According to the invention, a screen that can be used in a screw press, for example, is typically formed with the use of a screen body embodied according to the invention. The screen typically comprises fastening devices with which the screen can be connected to a frame, a screen basket or the like, for example, in order to detachably arrange the screen in a housing shell of a screw press, for example. The screen can, in principle, be formed solely by the screen body, or can also contain the screen body as a separate body along with additional components that can be used to fasten the screen body in the screen press, for example.

According to the invention, the other object is attained with a screen of the type named at the outset in which the screen body is composed of a material which is formed in a sintering process and/or an additive manufacturing process, in particular a 3D printing process, wherein the screen is in particular produced in a method according to the invention.

With a corresponding screen, a particularly lengthy operation of a screw press or other apparatus in which a consistent friction value of a surface of the screen, or a consistent roughness of a surface of the screen, is advantageous can easily be ensured, especially since a corresponding roughness is still ensured even in the case of an abrasion of portions of the surface. According to the invention, at least the screen body of the screen, that is, the portion of the screen which comprises the screen surface with the openings, is embodied accordingly. Of course, it can in principle also be provided that the screen is entirely formed by a corresponding method and is embodied in one piece with the screen body.

It is beneficial if the screen body has an essentially constant, defined porosity up to a defined depth, in particular up to a depth of at least 1 mm. This ensures that the desired roughness is always present on the surface, even in the case of a corresponding level of wear. Starting at a level of wear exceeding a defined depth, that is, exceeding a defined distance from the screen surface, a replacement of the screen or of the screen body must often take place anyway, since a distance between the screw conveyor and the housing shell otherwise becomes too large.

It is preferably provided that the screen is embodied as part of an essentially rotationally symmetrical body, in particular as part of a shell of a cylinder or cone, so that multiple identical screens can be combined to form an essentially rotationally symmetrical body. In this manner, a screen can be embodied, for example, as a tile of an inner surface of a cylindrical housing shell so that a housing shell of a very large screw press can also be formed with correspondingly produced screens. Additionally, a replacement of a defective screen is then also possible in a very simple manner. The screen is normally embodied to be thin-walled.

In addition to the screen body, the screen typically also comprises devices for being connected to a frame or the like, preferably in a detachable manner. The devices can, for example, be embodied as openings through which the screen can be connected to the frame by means of screws.

It is preferably provided that, on at least one lateral edge, a recess is provided, in particular a folded seam or a chamfer, in order to enable a form-fitting fixation of the screen in place, in particular in a direction perpendicular to the screen surface. This enables a particularly simple fixation of the screen in place in a frame or a support basket of a screw press. For example, T-shaped connecting rails can be provided which correspond to folded seams arranged on the edges of the screens, in order to connect the screens to a frame or a support basket in a form fit by screwing the T-shaped fastening means tight.

It is beneficial if, on a first lateral surface, which is preferably arranged approximately perpendicularly to the screen surface, a groove is provided. The screen can then be easily coupled to another screen or a frame via the lateral surface.

It has proven effective that, on a second lateral surface that is preferably approximately parallel to the first lateral surface, a projection which corresponds to the groove is arranged, so that two correspondingly embodied screens can be connected in a form and/or force fit, in particular by means of a click connection, via the first lateral surface and the second lateral surface by means of the projection and the groove. For this purpose, it can be provided that the projection is embodied with an indentation, so that the projection can engage in the correspondingly embodied groove.

For use in a screw press, a corresponding screen is typically embodied to be planar, preferably as part of a shell surface of a cylinder or cone, so that a corresponding housing shell of the screw press, which housing shell acts as a screen, can be formed by multiple screens connected to one another. An installation and removal of corresponding screens is particularly simple if said screens can be connected to one another in a form or force fit, in particular by means of a click connection.

In a screw press for separating liquid out of a transport material, having a worm shaft together with a screw conveyor arranged helically on the worm shaft as well as a housing shell surrounding said conveyor, wherein a transport corridor for the transport material being conveyed is embodied between the worm shaft and the housing shell, with the housing shell comprising at least one screen, so that the liquid separated out of the transport material can be conveyed through the housing shell, it is beneficial if the screen is embodied according to the invention.

As a result, a particularly long operational life of the screw press without a functional impairment of the same is possible, especially since a proper functioning can still be ensured even in the case of a superficial wear of the screen body.

It is advantageously provided that the screen only extends over a portion of a circumference of the housing shell, which is embodied to be essentially rotationally symmetrical, in particular cylindrical or in the shape of a truncated cone. This simplifies a production of the screen on the one hand. On the other hand, a defective screen can then also be easily replaced without replacing the entire housing shell.

It is preferably provided that multiple identical screens are provided which are connected to one another in a form and/or force fit, in particular by means of a click connection. The housing shell is thus essentially formed by a plurality of individual screens that are embodied to be tile-shaped, for example, and are therefore easy to replace. In this manner, it is also possible to form a housing shell of a very large screw press with screen bodies or screens formed in a 3D printing process, for example.

Because screens embodied according to the invention can easily be embodied with widely different geometries, it can also be provided that screens with different hole geometries and/or different open surfaces are used over a length of the screw press. As a result, a geometry of the screen can be adapted, for example, to operating conditions prevailing at the respective position in the screw press, in particular to a dry content of the transport material being dried at the respective position, so that a more efficient process can be achieved.

In principle, the screen can be arranged in the housing shell in widely different ways. It is beneficial if the screen is fixed in place in the housing shell using a fastening means, preferably by means of a screw connection. The fastening means can be embodied as a fastening rail, for example.

It has proven effective that the housing shell comprises a support structure, in particular a support basket, to which the screen is connected in a form and/or force fit, in particular by means of a screw connection. The screen or multiple screens with which a screening effect of the housing shell is achieved can then be easily replaced.

The support structure is normally embodied as a support basket. To be able to retrofit existing screw presses with screens according to the invention in a particularly simple manner, it is preferably provided that the support basket is composed of metal. A support basket of this type can then accommodate both conventionally fabricated metal sheet screens and also screens embodied according to the invention, so that existing screw presses can easily be equipped with screens embodied according to the invention.

It is preferably provided that the screen is connected to the support structure in a form fit using a fastening means. The fastening means can, for example, be embodied as a fastening rail with a T-shaped cross section and can be positioned between two screens so that one screen each is connected to the support structure by two fastening rails arranged on lateral edges of said screen.

Additionally, it can be provided that the fastening means is composed of the same material as the screen body. It is then ensured that the fastening means is affected by abrasive wear in the same way as the screen body itself, so that a consistent surface removal occurs, whereby an essentially even surface is maintained even in the case of wear.

Typically, the screen is composed of a single component that is constituted by a body formed in a sintering process and/or additive manufacturing process, in particular a 3D printing process. Features of the screen that are used for fastening, such as a folded seam, a groove, a projection, and the like, can thus also be easily formed over the course of the additive manufacturing, for example.

BRIEF DESCRIPTION OF THE DRAWINGS

Additional features, advantages, and effects of the invention follow from the exemplary embodiment described below. In the drawings which are thereby referenced.

DETAILED DESCRIPTION

Figure 1:
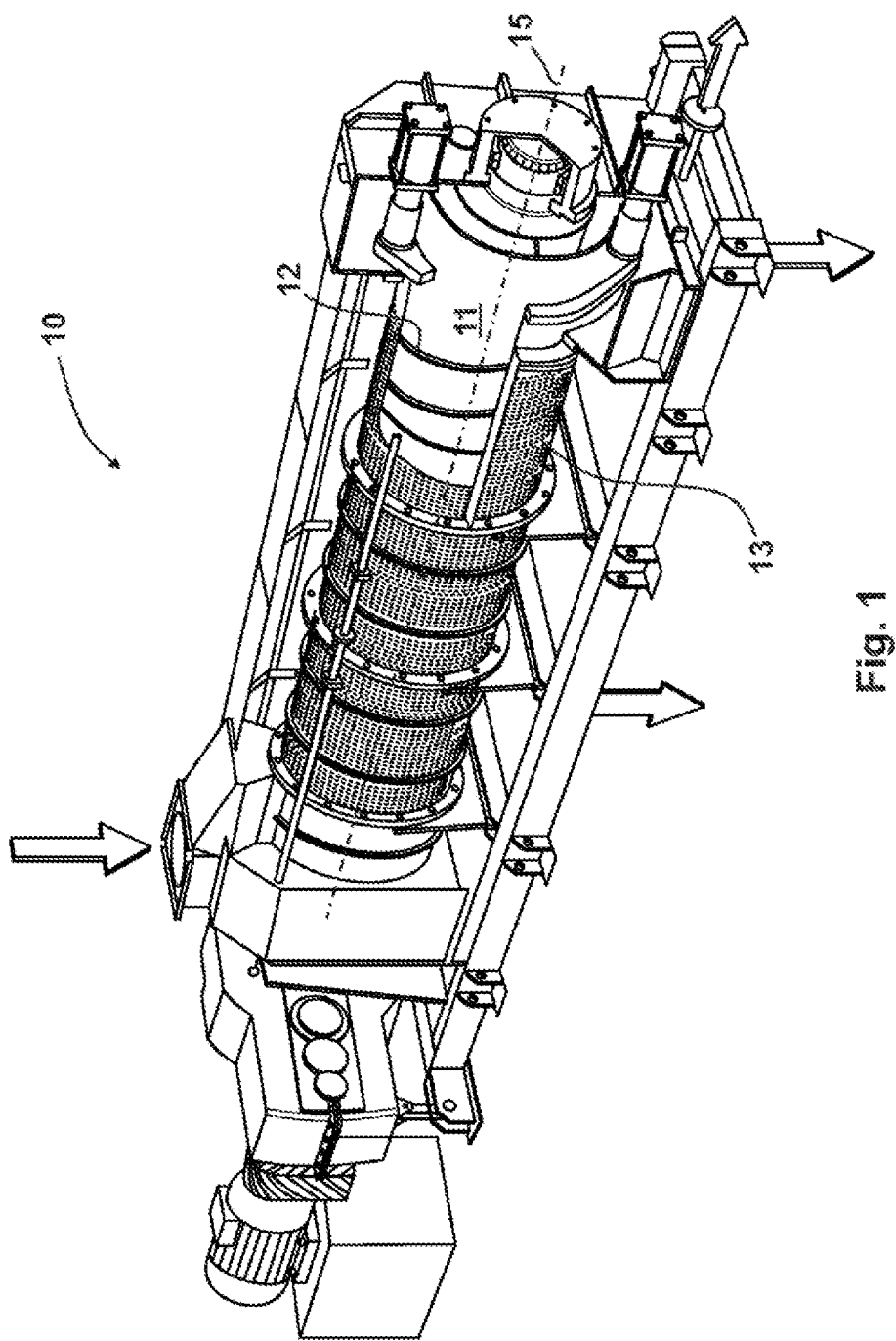
FIG. 1 shows a screw press.

FIG. 1 shows a screw press 10 according to the invention in a partial cutaway illustration. The screw press 10 is designed for the separation of liquid out of a transport material, in particular out of pulp, and comprises a worm shaft 11 arranged in a stationary housing shell 13 such that it can be rotated about a longitudinal axis 15 by means of a drive, wherein a screw conveyor 12 is arranged on the worm shaft 11 so that a transport corridor for the transport material being conveyed is formed between the worm shaft 11, the housing shell 13, and the screw conveyor 12. In a rotation of the worm shaft 11 about the longitudinal axis 15, the transport material is thus also conveyed along the longitudinal axis 15 in the transport corridor, wherein a pressure is applied to the transport material in order to separate liquid located in the transport material. The separated liquid is thereby carried out of an interior of the screw press 10 through the housing shell 13, wherein the housing shell 13 acts as a screen.

Figure 2:
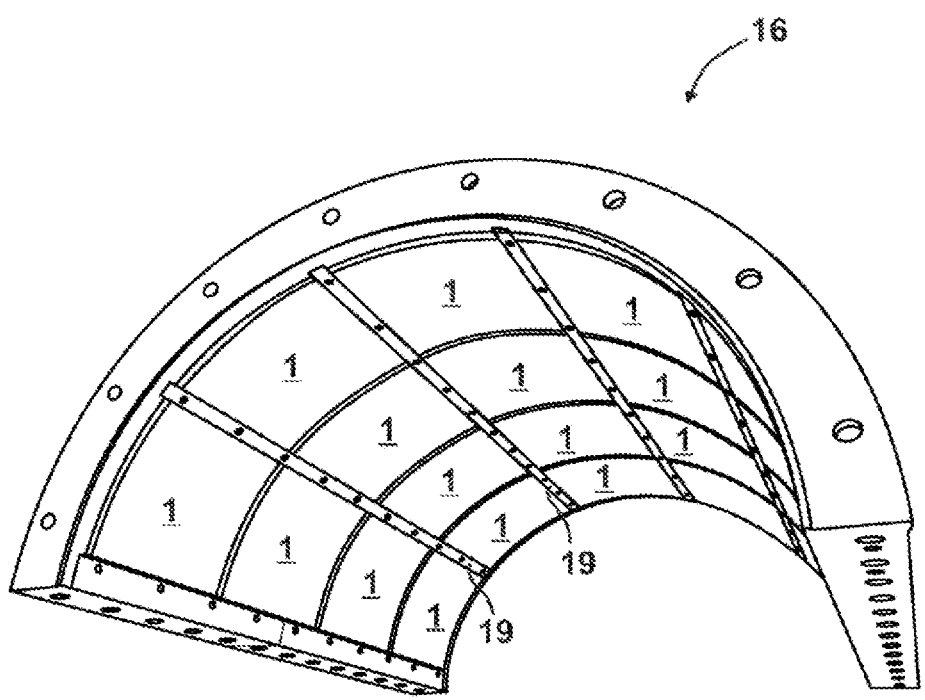
FIG. 2 shows a portion of a housing shell.

In the exemplary embodiment described, the housing shell 13 of the screw press 10 is formed by shell elements 16 that are essentially semi-cylindrical on the inside, one of which is illustrated in FIG. 2. The shell elements 16 comprise screens 1 which are fastened on a support basket 14 composed of metal in this case and which have openings 18 not illustrated in FIG. 2, in order to separate solids from the liquid during an operation of the screw press 10.

As can be seen, the individual screens 1 are thereby embodied as tiles, that is, as parts of a shell surface of a cylinder, and are supported radially outwards on the support basket 14. As a result, an internal pressure of, for example, 1 bar to 10 bar can be applied to the housing shell 13 during an operation of the screw press 10, without this potentially causing significant deformations of the screens 1. The tile-shaped screens 1 are connected in a form fit to the support basket 14 via fastening means embodied as fastening rails 19 that are embodied in a T shape in a cross section and are connected to the support basket 14 via screw connections.

A proper functioning of the screw press 10 fundamentally depends on a defined friction between the transport material and the screen surface 5 being ensured, since once a friction falls below a defined minimum value, the transport material is not conveyed along the longitudinal axis 15, but is rather rotated about the rotation axis with the worm shaft 11.

According to the invention, the screen body, that is, the portion of the screen 1 that comprises the screen surface 5 with the openings 18, is formed by a sintering process and/or an additive manufacturing process, so that even if a portion of a surface or of the screen surface 5 is removed, for example by an abrasive wear, when the transport material slides across the screen surface 5, a screen surface 5 with a predefined minimum roughness is still yielded and it is therefore not possible to achieve a completely smooth surface of the screen body, with which surface a proper functioning would no longer be ensured.

In the exemplary embodiment, the screen 1 is formed entirely by the screen body, even though an embodiment is, of course, also conceivable in which the screen body formed by a corresponding method is, for example, detachably arranged in a frame of a screen 1 formed by multiple components, which frame could also be composed of a different material than the screen body.

The fastening means embodied in this case as fastening rails 19 with a T-shaped cross section are formed from a material which corresponds to the screen body and can likewise be produced in a 3D printing process, so that an abrasion of the fastening rails 19 corresponds to an abrasion of the screen bodies and, even in the case of a wear or after lengthy operation of the screw press 10, a surface of the housing shell 13 that is essentially cylindrical on the inside and even is ensured.

Figure 3:
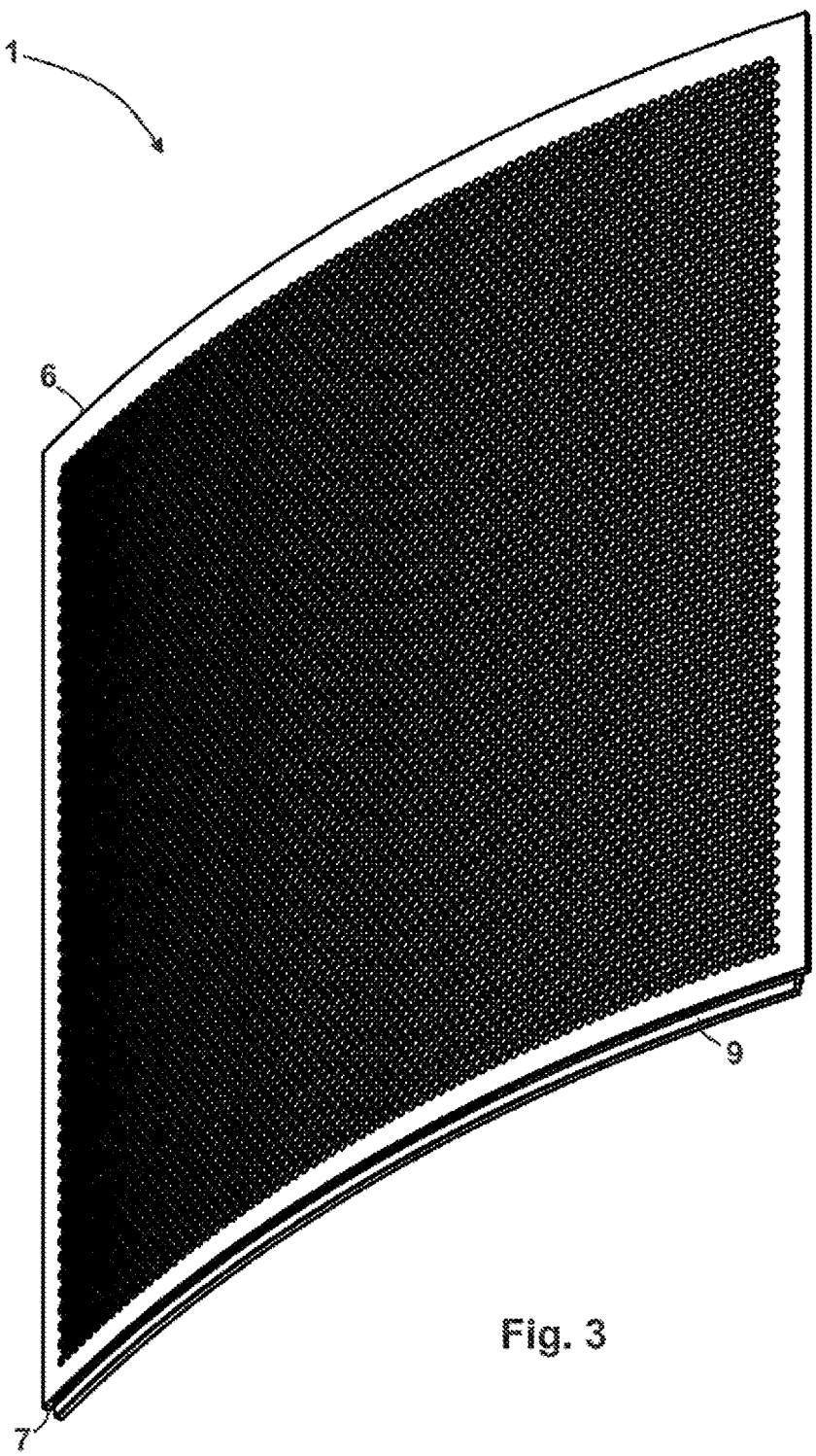
FIGS. 3 and 4 show a screen.
Figure 4:
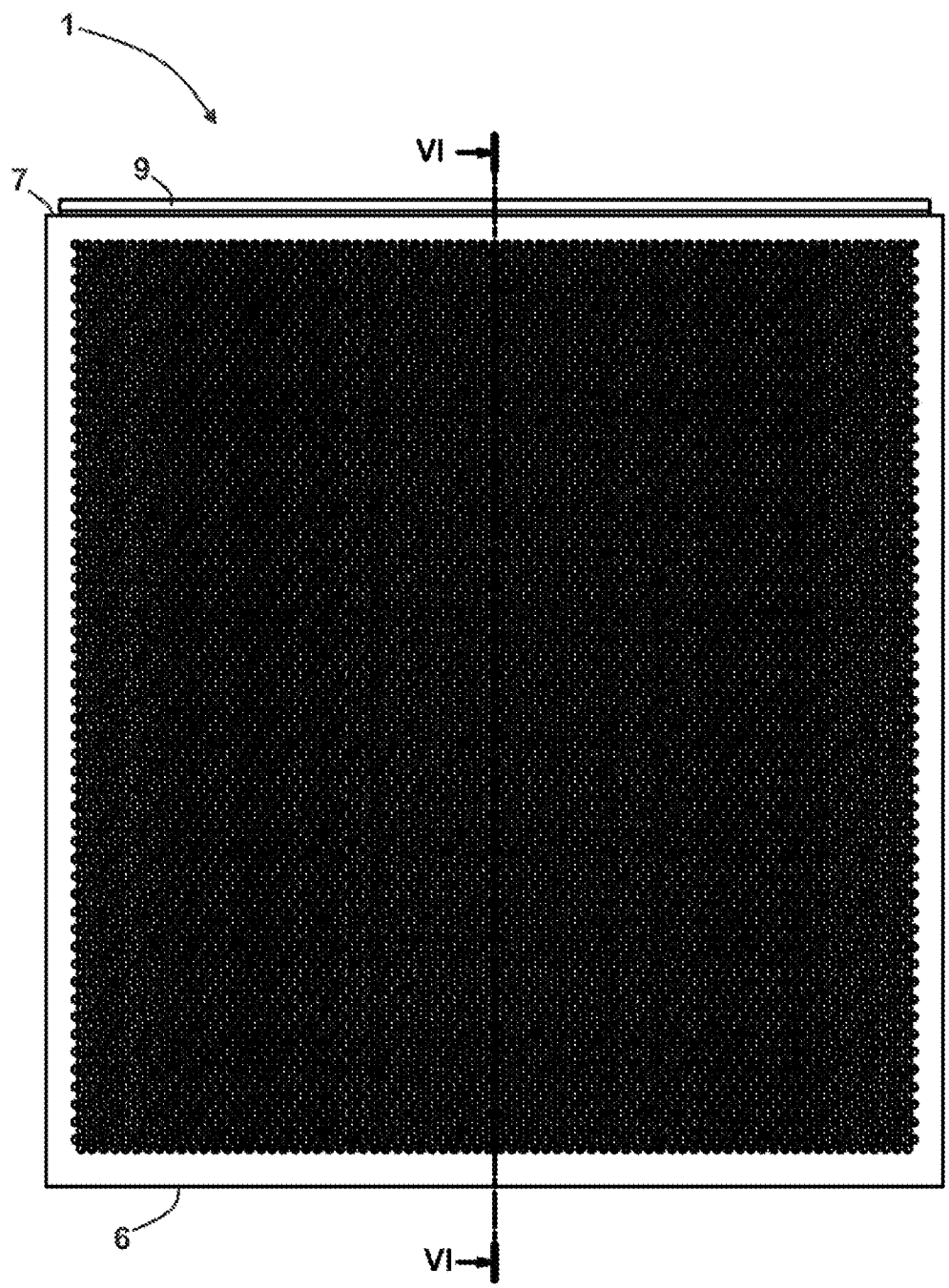
Figure 5:
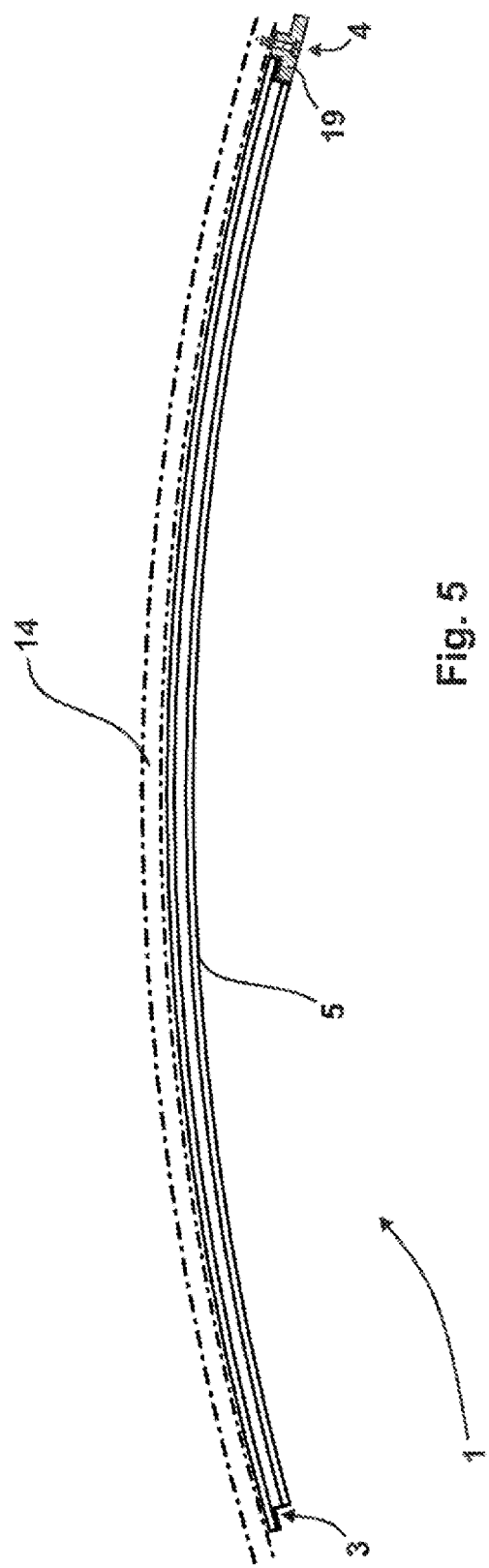
FIG. 5 shows a screen together with a support basket and a fastening means.
Figure 6:
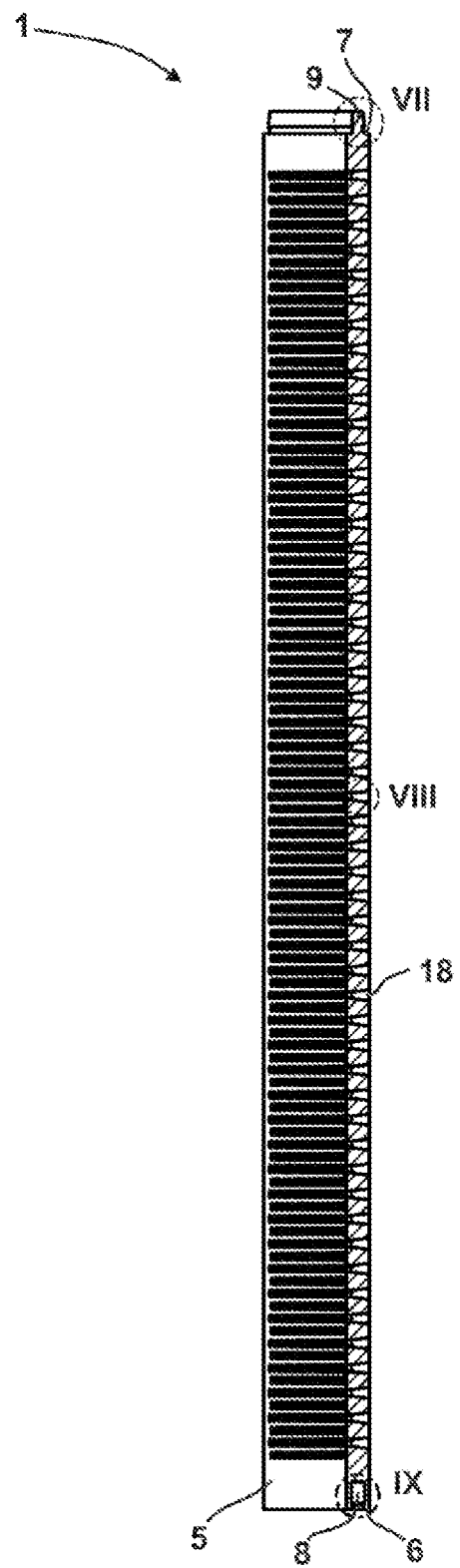
FIG. 6 shows a sectional illustration of a screen.
Figure 7:
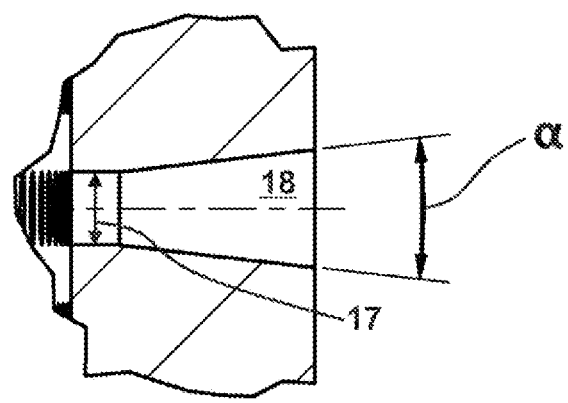
FIGS. 7 through 9 show detailed views from FIG. 6.
Figure 8:
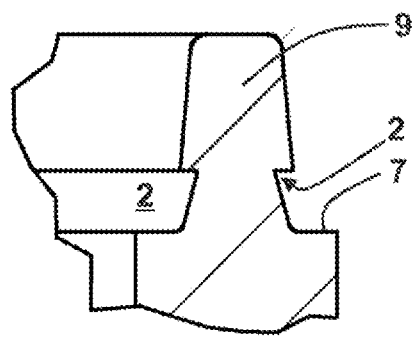
Figure 9:
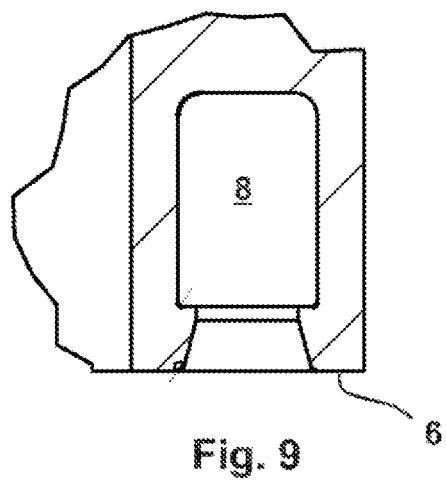

FIGS. 3 through 9 show a corresponding screen 1 in a detailed view, wherein FIG. 3 shows the screen 1 in an isometric view, FIG. 4 shows a top view of the screen 1, FIG. 5 shows a side view of the screen 1 illustrated in FIGS. 3 and 4 together with a portion of a support basket 14 and a fastening rail 19, and FIG. 6 shows a section along the line VI-VI in FIG. 4. FIG. 7 shows the detailed view VIII from FIG. 6, FIG. 8 shows the detailed view VII from FIG. 6, and FIG. 9 shows the detailed view IX from FIG. 6.

As can be seen, the screen 1 is essentially embodied in the shape of a cylinder shell, wherein on an inside screen surface 5 of the screen 1 a plurality of openings 18 that extend through the screen 1 in a radial direction is provided. As can be seen in FIG. 6 and in FIG. 7, a cross section of the openings 18 increases from an interior to an exterior, or with an increasing distance from the screen surface 5. Thus, it is easily prevented that the openings 18 clog and, at the same time, it is ensured that only solids with a diameter 17 smaller than the minimum diameter 17 of the openings 18 are carried out of the interior, which diameter 17 can be 1.5 mm, for example, in the exemplary embodiment illustrated. The openings 18 can also, as is visible in FIG. 7 in particular, be embodied with an opening angle α, which can be 10° to 30°, for example.

In order to be able to connect the individual screens 1 in the direction of the longitudinal axis 15 of the screw press 10 in a simple manner, a groove 8 is provided on a first lateral surface 6 of the screen 1 or of the screen body and a projection 9 corresponding to the groove 8 is provided on a second lateral surface 7 opposite of the first lateral surface 6, as can be seen in particular in FIG. 6, FIG. 8, and FIG. 9. The first lateral surface 6 and the second lateral surface 7, as well as the groove 8 and the projection 9, run in a circumferential direction in the screen 1 described in the exemplary embodiment.

The projection 9 is illustrated in detail in FIG. 8. As can be seen, the projection 9 comprises an indentation 2 so that an engagement of the projection 9 in the groove 8 illustrated in detail in FIG. 9 is possible. In this manner, a click mechanism for the simple connection of multiple screens 1 along the longitudinal axis 15 is easily achieved.

A fastening of the screens 1 in the support basket 14 can occur, as illustrated in FIG. 2, via two fastening rails 19 arranged along the screen 1. For this purpose, on lateral edges of the screen body that run approximately parallel to the longitudinal axis 15 in an installed state, one folded seam 3 each is embodied which corresponds to a cross section of the fastening rail 19, so that when the fastening rail 19 is arranged between two screens 1, as can be seen in FIG. 5, an essentially cylindrical inner side of the housing shell 13 results.

In FIG. 5, the support basket 14 arranged behind the screen 1 in the screen press 10 and a fastening rail 19 are also illustrated schematically. As can be seen, the fastening rail 19 embodied in this case with an approximately T-shaped cross section is connected to the support basket 14 by means of a screw 4, in order to fix the screen 1 in place on the support basket 14 in a form fit.

Alternatively, bores could also be provided in the screen 1 in order to screw the screen 1 directly to the support basket 14.

In the exemplary embodiment, the screen body and the screen 1 are formed in one piece from a plastic in a 3D printing process, wherein the openings 18 are also formed during the 3D printing process. A material is thus obtained which exhibits a constant roughness even if there is an abrasion on the screen surface 5, so that the proper functioning of the screen press 10 is ensured even in the case of a wear of the screen body.

Different materials can also be used in forming the screen 1, in order to achieve a higher rigidity and a lower porosity at an increasing distance from the screen surface 5, for example, so that a high rigidity is attained despite beneficial tribological properties. In addition, fibers can also be worked into the screen 1 or formed in the screen body, in order to obtain beneficial mechanical properties.

Thus, with a screen 1 embodied according to the invention, an operation of a screw press 10 over a particularly long period of time without functional impairment is possible, especially since a wear on the screen body also does not cause a reduction in a friction between the transport material and the screen 1. Furthermore, screens 1 with widely different geometries can easily be formed in order to be able to provide, for example, different screens 1 having different hole geometries and/or different open surfaces for various operating conditions which can occur, for example, depending on both a transport material being dried and also on a position on a screw press. As a result, corresponding drying processes can be carried out with particular efficiency.

The invention claimed is:

1. A method for producing a screen body for a screen used in a screw press, the screen body including one or more openings on a screen surface, the method comprising:
    forming the screen body is formed by a sintering process and/or an additive manufacturing process, and
    at least partially forming the screen body from a material which is dimensionally stable at a temperature of at least 45° C. and a pressure load of 1.5 N/mm².

2. The method according to claim 1, wherein the screen body is formed by a plastic, a metal, or a ceramic material.

3. The method according to claim 1, wherein fibers are worked into the screen body and/or formed in the screen body when the screen body is being formed.

4. The method according to claim 1, wherein the screen body is formed from different materials over a thickness.

5. The method according to claim 4, wherein the screen body is formed from a first material, which constitutes the screen surface, and a second material, which constitutes a region of the screen body spaced apart from the screen surface, wherein the second material has a higher rigidity than the first material.

6. The method according to claim 1, wherein the screen body is at least partially formed from a material which is dimensionally stable at a temperature of at least 90° C., and a pressure load of 1.5 N/mm².

7. The method according to claim 1, wherein the one or more openings are formed during the sintering process and/or the additive manufacturing process.

8. The method according to claim 1, wherein the additive manufacturing process comprises a 3D printing process.

9. A screen for a screw press, having produced according to the method of claim 1, the screen comprising:
    a screen body including one or more openings on a screen surface,
    wherein the screen body is composed of a material which is formed in a sintering process and/or an additive manufacturing process and is at least partially formed from a material which is dimensionally stable at a temperature of at least 45° C. and a pressure load of 1.5 N/mm².

10. The screen according to claim 9, wherein the screen body has an essentially constant, defined porosity up to a defined depth.

11. The screen according to claim 9, wherein the screen is embodied as part of an essentially rotationally symmetrical body so that multiple identical screens are combinable to form an essentially rotationally symmetrical body.

12. The screen according to claim 9, wherein, on at least one lateral edge, a recess is provided in order to enable a form-fitting fixation of the screen in place.

13. The screen according to claim 9, wherein, on a first lateral surface, a groove is provided.

14. The screen according to claim 13, wherein, on a second lateral surface, a projection which corresponds to the groove is arranged, so that two correspondingly embodied screens are connectable in a form and/or force fit via the first lateral surface and the second lateral surface by the projection and the groove.

15. The screen according to claim 10, wherein the defined depth is up to a depth of at least 1 mm.

16. The screen according to claim 11, wherein the part of the essentially rotationally symmetrical body of the screen is a part of a shell of a cylinder or cone.

17. The screen according to claim 12, wherein, on the at least one lateral edge, the recess is a folded seam or a chamfer.

18. The screen according to claim 13, wherein the first lateral surface is arranged approximately perpendicularly to the screen surface.

19. The screen according to claim 14, wherein the second lateral surface is approximately parallel to the first lateral surface.

20. A screw press for separating liquid out of a transport material, comprising:

a worm shaft together with a screw conveyor arranged helically on the worm shaft;

a housing shell surrounding said conveyor, wherein a transport corridor for the transport material to be conveyed is embodied between the worm shaft and the housing shell, and wherein the housing shell comprises at least one screen that includes one or more openings on a screen surface and is composed of a material that is formed in a sintering process and/or an additive manufacturing process and which is at least partially formed from a material that is dimensionally stable at a temperature of at least 45° C. and a pressure load of 1.5 N/mm$^2$, so that the liquid separated out of the transport material is conveyable through the housing shell.

21. The screw press according to claim 20, wherein the screen only extends over a portion of a circumference of the housing shell, which is embodied to be essentially cylindrical or in the shape of a truncated cone.

22. The screw press according to claim 20, wherein multiple identical screens are provided which are connectable to one another in a form and/or force fit connection.

23. The screw press according to claim 20, wherein the screen is fixed in place in the housing shell using a fastener.

24. The screw press according to claim 20, wherein the housing shell comprises a support structure to which the screen is connectable in a form and/or force fit connection.

25. The screw press according to claim 23, wherein the fastener is composed of the same material as the screen.

26. The screw press according to claim 22, wherein the multiple identical screens are connectable to one another by a click connection.

27. The screw press according to claim 23, wherein the screen is fixed in place in the housing shell by a screw connection.

28. The screw press according to claim 24, wherein the support structure comprises a support basket.

29. The screw press according to claim 24, wherein the screen is connectable to the support structure by a screw connection.

* * * * *